(12) United States Patent
Yoshida et al.

(10) Patent No.: US 8,850,889 B2
(45) Date of Patent: Oct. 7, 2014

(54) ACCELERATION SENSOR

(75) Inventors: Hitoshi Yoshida, Osaka (JP); Yuji Suzuki, Osaka (JP); Nobuyuki Ibara, Osaka (JP); Hideki Ueda, Osaka (JP); Takeshi Okada, Osaka (JP)

(73) Assignee: Panasonic Corporation, Osaka (JP)

( * ) Notice: Subject to any disclaimer, the term of this patent is extended or adjusted under 35 U.S.C. 154(b) by 306 days.

(21) Appl. No.: 13/058,923

(22) PCT Filed: Nov. 19, 2009

(86) PCT No.: PCT/JP2009/069631
§ 371 (c)(1),
(2), (4) Date: Feb. 14, 2011

(87) PCT Pub. No.: WO2010/061777
PCT Pub. Date: Jun. 3, 2010

(65) Prior Publication Data
US 2011/0138914 A1 Jun. 16, 2011

(30) Foreign Application Priority Data

Nov. 25, 2008 (JP) ................................. 2008-299989
Nov. 25, 2008 (JP) ................................. 2008-300004

(51) Int. Cl.
*G01P 15/125* (2006.01)
*G01P 15/08* (2006.01)
*G01P 15/18* (2013.01)

(52) U.S. Cl.
CPC ........... *G01P 15/125* (2013.01); *G01P 15/0802* (2013.01); *G01P 15/18* (2013.01)
USPC ...................................... 73/514.32

(58) Field of Classification Search
USPC .................................. 73/514.32, 514.36, 510
See application file for complete search history.

(56) References Cited

U.S. PATENT DOCUMENTS 5,054,320 A 10/1991 Yvon
6,293,149 B1 9/2001 Yoshida et al.
(Continued)

FOREIGN PATENT DOCUMENTS

CN 101198874 6/2008
JP 64-29775 1/1989
(Continued)

OTHER PUBLICATIONS

Official Action, issued May 3, 2012, for counterpart Chinese patent application from China's State Intellectual Property Office (SIPO), with partial English language translation.

(Continued)

*Primary Examiner* — John Chapman, Jr.
(74) *Attorney, Agent, or Firm* — Greenblum & Bernstein, P.L.C.

(57) ABSTRACT

An acceleration sensor includes: a rectangular moving electrode; a pair of beams which connect to centers of two opposite sides of the moving electrode, and support the moving electrode freely swingably; and first and second fixed electrodes which are provided on one side and other side of a boundary line, respectively, and are arranged to be opposed to a front surface of the moving electrode at a predetermined interval. A straight line that connects the pair of beams to each other is taken as the boundary line. Then, on a back surface of the moving electrode, first and second recessed portions are formed on one side of the boundary line and the other side thereof, respectively.

22 Claims, 6 Drawing Sheets

(56) References Cited

U.S. PATENT DOCUMENTS

| | | |
|---|---|---|
| 6,755,081 B2 | 6/2004 | Furukubo et al. |
| 7,107,847 B2 | 9/2006 | Yoshida et al. |
| 7,367,232 B2 * | 5/2008 | Vaganov et al. ........... 73/514.33 |
| 7,426,863 B2 | 9/2008 | Kuisma |
| 7,464,591 B2 | 12/2008 | Fukuda et al. |
| 8,176,782 B2 * | 5/2012 | Furukubo et al. .......... 73/514.32 |
| 2006/0169043 A1 | 8/2006 | McNeil |
| 2007/0000323 A1 | 1/2007 | Kuisma |

FOREIGN PATENT DOCUMENTS

| | | |
|---|---|---|
| JP | 64-59161 | 3/1989 |
| JP | 2000-187041 | 7/2000 |
| JP | 2007-298405 | 11/2007 |
| WO | 2006/083376 | 8/2006 |
| WO | 2006/134232 | 12/2006 |

OTHER PUBLICATIONS

Extended European Search Report, issued May 8, 2012, for counterpart European patent application from the European Patent Office (EPO).

U.S. Appl. No. 13/012,161 to Atsushi Misawa et al., filed Jan. 24, 2011.

* cited by examiner

ACCELERATION SENSOR

TECHNICAL FIELD

The present invention relates to an acceleration sensor that detects an acceleration, which is applied to a moving electrode, by detecting a change of an electrostatic capacity between the moving electrode and a fixed electrode, the change following a swing of the moving electrode.

BACKGROUND ART

Heretofore, an acceleration sensor has been known, which includes: a rectangular weight portion that has a moving electrode; beams which support the weight portion freely swingably; and first and second fixed electrodes arranged so as to be opposed to the weight portion (for example, refer to Patent Literature 1). In the acceleration sensor as described above, a recessed portion is formed on the weight portion so that a rotation moment, in which a straight line (beam axis) that connects a pair of the beams to each other is used as a rotation axis, can be generated when acceleration is applied to the acceleration sensor. In such a way, one side and the other side in the weight portion, which are defined by the beam axis taken as a boundary line, are differentiated from each other in terms of weight.

CITATION LIST

Patent Literature

Patent Literature 1: Specification of United States Patent Application Publication No. 2007/0000323

SUMMARY OF INVENTION

Here, in the case where the recessed portion is formed only on one side in the weight portion, which is defined by the beam axis taken as the boundary line, the moving electrode on one side becomes prone to be affected by distortion. As a result, the moving electrode is deformed, and it becomes difficult to precisely control a distance between the moving electrode and the fixed electrodes. From a background as described above, in the acceleration sensor described in Patent Literature 1, such deformation of the moving electrode is suppressed by providing a reinforcement member on the recessed portion. However, in the case of providing the reinforcement member on the recessed portion, at the time of detecting the accelerations in two directions which are the x-direction and the z-direction, a difference occurs in detection sensitivity between the two directions. Therefore, in the acceleration sensor described in Patent Literature 1, the detection sensitivity is equalized between the two directions by thickening a thickness of the weight portion. However, in the case of thickening the thickness of the weight portion, a long manufacturing time (etching time) is required for forming the recessed portion.

The present invention has been made in consideration of the problems as described above, which are inherent in the conventional technology. Then, it is an object of the present invention to provide an acceleration sensor capable of equalizing the detection sensitivity between the two directions without requiring a long manufacturing time.

An acceleration sensor according to an aspect of the present invention includes: a rectangular moving electrode; a pair of beams which connect to centers of two opposite sides of the moving electrode, and support the moving electrode freely swingably; and first and second fixed electrodes which are provided on one side and other side of a boundary line, respectively, and are arranged to be opposed to a front surface of the moving electrode at a predetermined interval, wherein a straight line that connects the pair of beams to each other is taken as the boundary line. Then, on a back surface of the moving electrode, first and second recessed portions are formed on one side of the boundary line and the other side thereof, respectively.

DESCRIPTION OF EMBODIMENTS

First Embodiment

A description is first made in detail of an acceleration sensor of a first embodiment based on the drawings.

<Configuration of Acceleration Sensor>

Figure 1:
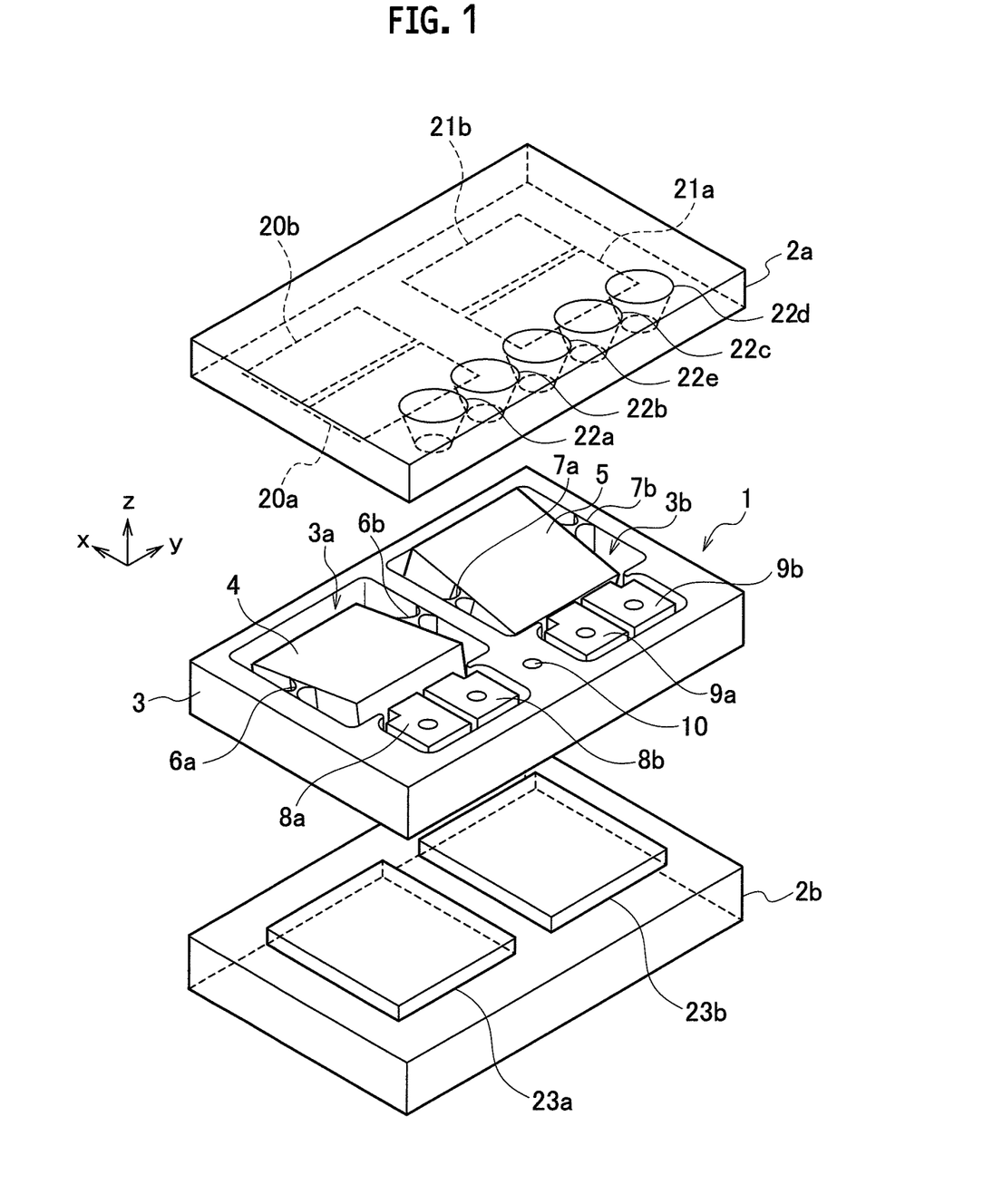
FIG. 1 is an exploded perspective view showing a configuration of an acceleration sensor according to a first embodiment of the present invention.

As shown in FIG. 1, an acceleration sensor of this embodiment has a configuration in which upper and lower surfaces of a sensor chip 1 formed of a silicon SOI substrate are sandwiched by an upper fixed plate 2a and a lower fixed plate 2b. The sensor chip 1 includes: a frame 3 that has two rectangular frames 3a and 3b; and two rectangular moving electrodes 4 and 5 arranged in the rectangular frames 3a and 3b in a state of being spaced apart from sidewalls of the rectangular frames 3a and 3b. Moreover, the sensor chip 1 includes a pair of beams 6a and 6b which support the moving electrode 4 freely swingably with respect to the frame 3 by coupling substantial centers of two opposite sides on side surfaces of the moving electrode 4 to sidewalls of the rectangular frame 3a. Furthermore, the sensor chip 1 includes a pair of beams 7a and 7b which support the moving electrode 5 freely swingably with respect to the frame 3 by coupling substantial centers of two opposite sides on side surfaces of the moving electrode 5 to sidewalls of the rectangular frame 3b.

The above-described acceleration sensor includes: detecting electrodes 8a and 8b arranged at a predetermined interval from the frame 3 and the moving electrode 4; and detecting electrodes 9a and 9b arranged at a predetermined interval from the frame 3 and the moving electrode 5. Moreover, the above-described acceleration sensor includes a grounding electrode 10 formed on a front surface of the frame 3 between the detecting electrode 8b and the detecting electrode 9a. Furthermore, the above-described detecting electrodes 8a and 8b are arranged at a predetermined interval from each other, and the above-described detecting electrodes 9a and 9b are also arranged at a predetermined interval from each other. Note that the detecting electrodes 8a and 8b and the detecting electrodes 9a and 9b are electrically connected to fixed electrodes 20a and 20b and fixed electrodes 21a and 21b, which will be described later, respectively.

Figure 2:
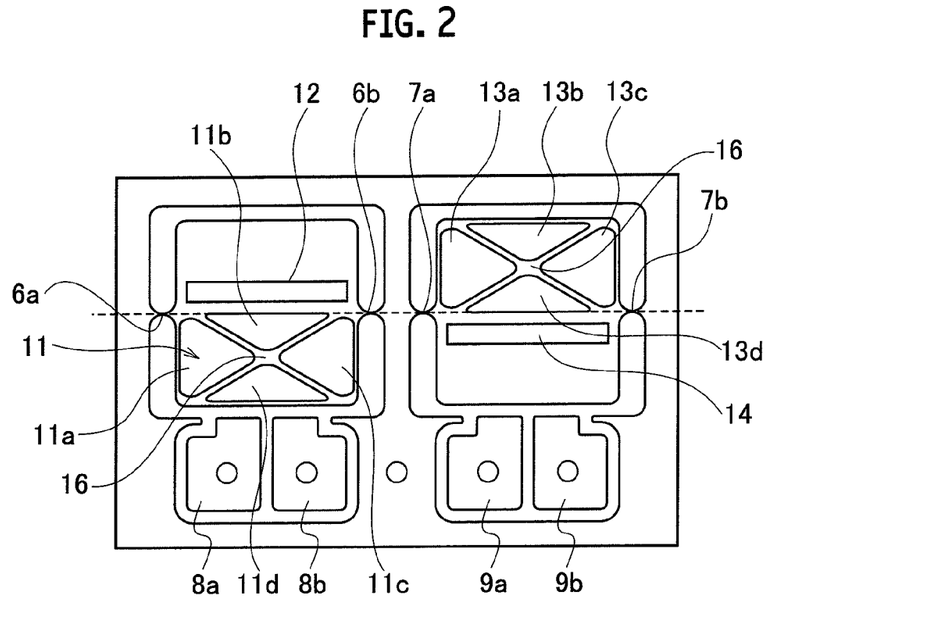
FIG. 2 is a lower surface view showing a sensor chip in the acceleration sensor.

In this embodiment, as shown in FIG. 2, gaps are formed between the detecting electrode 8a and the detecting electrode 8b, between the detecting electrode 9a and the detecting electrode 9b, between the detecting electrodes 8a and 8b and the frame 3, between the detecting electrodes 9a and 9b and the frame 3, between the detecting electrodes 8a and 8b and the moving electrode 4, and between the detecting electrodes 9a and 9b and the moving electrode 5. With such a configuration, the respective detecting electrodes are electrically insulated from one another, and accordingly, parasitic capacitance of the respective detecting electrodes and cross talk among the detecting electrodes are reduced, thus making it possible to perform highly accurate capacity detection.

Then as shown in FIG. 2, on a back surface of the moving electrode 4, a recessed portion 11 as a first recessed portion is formed on one side of a boundary line in the case where a straight line that connects the beams 6a and 6b to each other is taken as the boundary line. Note that this recessed portion 11 is partitioned into four by a reinforcement member 16 arranged in a diagonal fashion in an inside of the recessed portion 11, and is formed as recessed portions 11a, 11b, 11c and 11d. Moreover, on the back surface of the moving electrode 4, a recessed portion 12 is formed as a second recessed portion on the other side of the boundary line. In a similar way, on a back surface of the moving electrode 5, recessed portions 13a, 13b, 13c and 13d are formed as a first recessed portion partitioned by a reinforcement member 16 are formed on one side of a boundary line in the case where a straight line that connects the beams 7a and 7b to each other is taken as the boundary line. Moreover, on the back surface of the moving electrode 5, a recessed portion 14 is formed as a second recessed portion on the other side of the boundary line.

In this embodiment, the first recessed portion and the second recessed portion are formed separately from each other; however, the first recessed portion and the second recessed portion may be formed integrally with each other, for example, by extending the first recessed portion to the other side beyond the boundary line. Moreover, a shape of the first recessed portion is not limited to a triangular shape shown in FIG. 2, and may be a rectangular shape similar to that of the second recessed portion.

Figure 3:
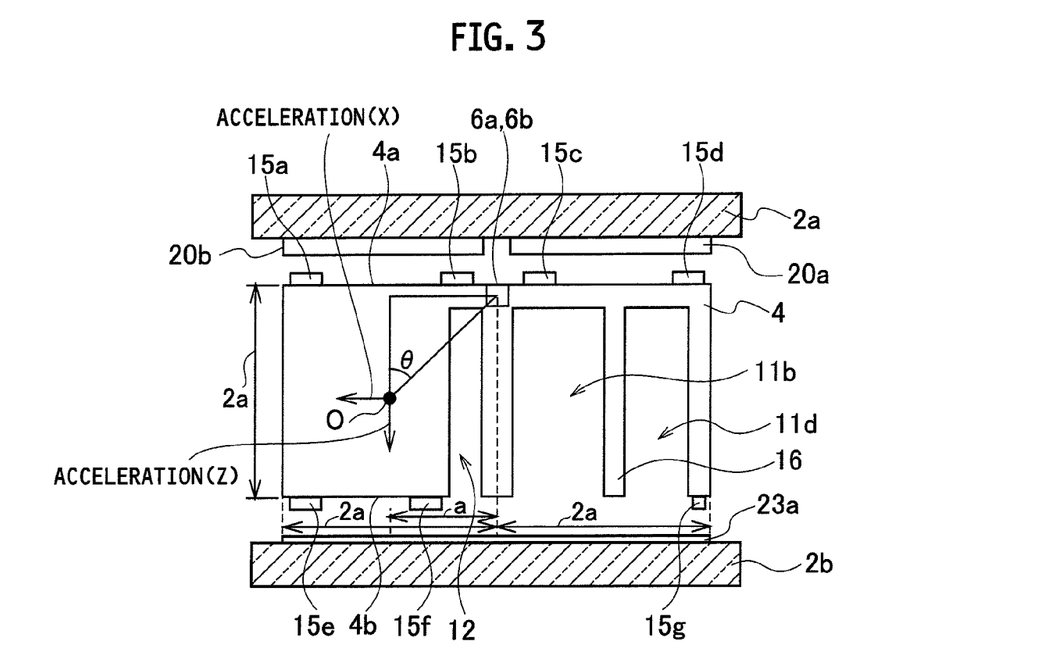
FIG. 3 is a partial cross-sectional view of the acceleration sensor.

Here, as shown in FIG. 3, it is preferable that a position at which the second recessed portion 12 is formed be set so that an angle made by a perpendicular line drawn down from a center of gravity O of the moving electrode 4 to a front surface 4a thereof and a straight line that connects the center of gravity O of the moving electrode 4 and the boundary line to each other can be approximately 45 degrees. In such a way, detection sensitivities in the x-direction and the z-direction become equal to each other, and accordingly, the detection sensitivities in the respective directions can be enhanced. However, since a rotation moment is increased more by forming the second recessed portion on a more distant side from the boundary line, such detection sensitivity of the acceleration sensor can be enhanced. Note that, in FIG. 3, the boundary line is a straight line that connects center positions on cross sections of the beams 6a and 6b. Moreover, in the acceleration sensor of FIG. 3, the second recessed portion 12 is formed so that the center of gravity O can be located on a place where a length from the boundary line is "a" in the case where a length on the other side of the boundary line in the moving electrode 4 is defined as "2a". Note that, in the acceleration sensor of FIG. 3, in the moving electrode 4, a length on one side of the boundary line, on which the recessed portions 11b and 11d are formed, is also "2a", and a height of the moving electrode 4 is also "2a".

On the surfaces 4a and 4b of each of the moving electrodes 4 and 5, which are opposed to the upper fixed plate 2a and the lower fixed plate 2b, as shown in FIG. 3, a plurality of protrusions 15a to 15g made of silicon or silicon oxide are formed. The protrusions 15a to 15g as described above are formed, whereby each of the moving electrodes 4 and 5 does not directly collide with the upper fixed plate 2a and the lower fixed plate 2b, which are opposed thereto, even in the case where such a large acceleration that exceeds a measurement range is applied to each of the moving electrodes 4 and 5. Accordingly, breakage of the sensor chip 1 can be suppressed. Note that, in this embodiment, the protrusions are formed on each of the surfaces of the moving electrodes 4 and 5, which are opposed to the upper fixed plate 2a and the lower fixed plate 2. However, similar protrusions may be formed on surfaces of the upper fixed plate 2a and the lower fixed plate 2b, which are opposed to the moving electrodes 4 and 5.

As mentioned above, the protrusions 15a to 15g can be formed of silicon or silicon oxide. Moreover, besides this, the protrusions 15a to 15g can be formed of a carbon material. As the carbon material as described above, a carbon nanotube can be used.

As shown in FIG. 3, the upper fixed plate 2a is arranged so as to be opposed to the front surface of each of the moving electrodes 4 and 5 at a predetermined interval, and further, is formed of a glass substrate. Then, on a front surface side of the upper fixed plate 2a, which is opposed to the moving electrode 4, the fixed electrodes 20a and 20b (first and second fixed electrodes) are provided on one side and other side of the boundary line, respectively in the case where the straight line that connects the centers of the beams 6a and 6b to each other is taken as the boundary line. Moreover, the fixed electrodes 20a and 20b are arranged so as to be opposed to the front surface 4a of the moving electrode 4 at a predetermined interval. Furthermore, in a similar way, on a front surface side of the fixed plate 2a, which is opposed to the moving electrode 5, the fixed electrodes 21a and 21b (first and second fixed electrodes) are provided on one side and other side of the boundary line, respectively in the case where the straight line that connects the centers of the beams 7a and 7b to each other is taken as the boundary line. Moreover, in a similar way to the fixed electrodes 20a and 20b, the fixed electrodes 21a and 21b are arranged so as to be opposed to the front surface of the moving electrode 5 at a predetermined interval.

Moreover, as shown in FIG. 1, through holes 22a to 22e are formed at positions of the upper fixed plate 2a, which are opposed to the detecting electrodes 8a, 8b, 9a and 9b and the grounding electrode 10. Outputs of the detecting electrodes 8a and 8b and the detecting electrodes 9a and 9b, which are connected to the fixed electrodes 20a and 20b and the fixed electrodes 21a and 21b, respectively, and an output of the grounding electrode 10 are taken out through these through holes 22a to 22e.

Moreover, as shown in FIG. 3, the lower fixed plate 2b is arranged so as to be opposed to the back surface of each of the moving electrodes 4 and 5 at a predetermined interval, and further, is formed of a glass substrate. Then, on a surface side of the lower fixed plate 2b, which is opposed to the moving electrode 4 and 5, adhesion prevention films 23a and 23b are arranged. The adhesion prevention films 23a and 23b are arranged so as to be opposed to the back surfaces 4 and 5 at a predetermined interval. The adhesion prevention films 23a and 23b as described above prevent the moving electrodes 4 and 5 from adhering to the lower fixed plate 2b at the time when the moving electrodes 4 and 5 are operating, and have a shock absorption effect since the moving electrodes 4 and 5 and the lower fixed plate 2b do not directly contact each other even at the time when the moving electrodes 4 and 5 undergo an excessive shock. Note that the adhesion prevention films 23a and 23b can be formed of the same material as that of the fixed electrodes 20a, 20b, 21a and 21b, and for example, can be formed of an aluminum-based alloy or the like.

Figure 4:
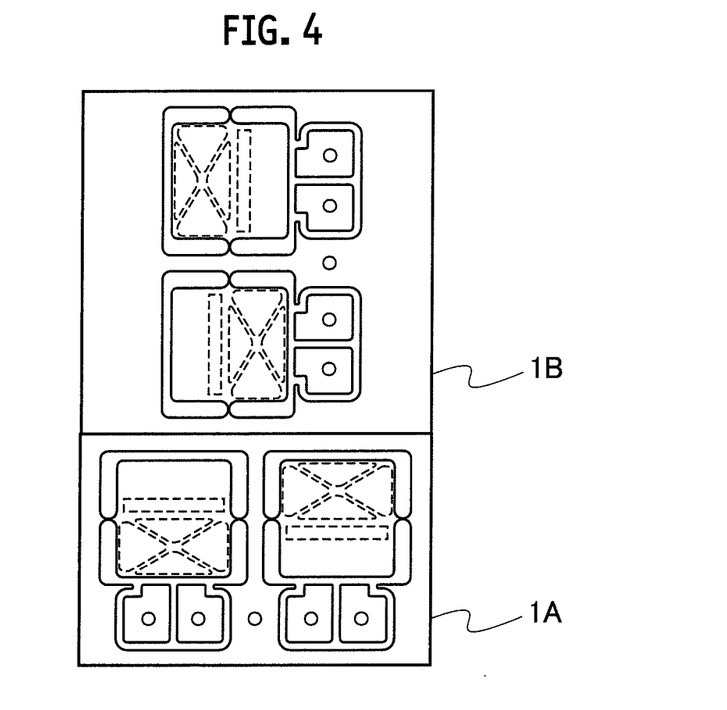
FIG. 4 is a schematic view showing an example of an acceleration sensor structure including a plurality of the acceleration sensors according to the first embodiment.

In the embodiment of FIG. 1 and FIG. 2, two acceleration sensors are arranged in the same chip plane, and one of the acceleration sensors is arranged so as to rotate by 180 degrees with respect to the other acceleration sensor in the chip plane, whereby an acceleration sensor structure is composed. Moreover, in the embodiment of FIG. 1 and FIG. 2, two acceleration sensors are arranged adjacent to each other. However, an acceleration sensor structure according to the present invention is not limited to the embodiment as described above. For example, as shown in FIG. 4, another sensor chip 1B is provided, which is rotated by 90 degrees in the inside of the x-y plane with respect to a sensor chip 1A similar to that of FIG. 1, whereby a configuration may be adopted, in which acceleration in the y-direction is made detectable in addition to the accelerations in two directions which are the x-direction and the z-direction.

Figure 5:
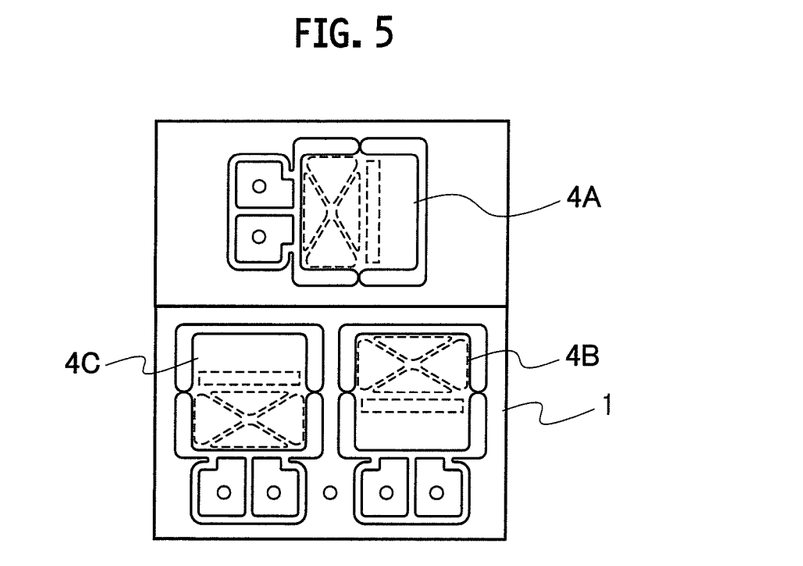
FIG. 5 is a schematic view showing another example of the acceleration sensor structure including the plurality of the acceleration sensors according to the first embodiment.

Moreover, as shown in FIG. 5, three acceleration sensors may be arranged in the same chip plane, and second and third acceleration sensors (moving electrodes) 4A and 4B may be arranged so as to rotate by 90 degrees and 180 degrees, respectively with respect to a first acceleration sensor (moving electrode) 4C in the inside of the chip plane. An acceleration sensor structure, which is constructed as described above, can detect accelerations in three axes which go along the x-direction, the y-direction and the z-direction.

<Operations of Acceleration Sensor>

The above-described acceleration sensor performs a self-test in the following manner, and detects the accelerations in the x-direction and the z-direction, which are shown in FIG. 1.

(Self-Test)

In the case of operating the moving electrode 4, an electrostatic force is generated between the moving electrode 4 and the fixed electrode 20a or the fixed electrode 20b. In a similar way, in the case of operating the moving electrode 5, an electrostatic force is generated between the moving electrode 5 and the fixed electrode 21a or the fixed electrode 21b. Similar operation confirmation may be performed by generating an electrostatic force between the adhesion prevention films 23a and 23b and the moving electrodes 4 and 5. In such a way, the moving electrodes 4 and 5 swing, whereby electrostatic capacities between the moving electrode 4 and the fixed electrodes 20a and 20b and between the moving electrode 5 and the fixed electrodes 21a and 21b are changed. Accordingly, it can be confirmed whether or not the acceleration sensor operates normally.

(Detection of Acceleration in X-Direction)

In the case where the acceleration in the x-direction is applied to the moving electrode 4, the electrostatic capacities C1 and C2 between the moving electrode 4 and the fixed electrodes 20a and 20b individually become as in Expressions (1) and (2) shown below. Note that, in Expressions (1) and (2), a parameter C0 indicates electrostatic capacities between the moving electrode 4 and the fixed electrodes 20a and 20b in a state where the acceleration in the x-direction is not applied to the moving electrode 4.

$$C1 = C0 - \Delta C \quad (1)$$

$$C2 = C0 + \Delta C \quad (2)$$

Moreover, in a similar way, in the case where the acceleration in the x-direction is applied to the moving electrode 5, the electrostatic capacities C3 and C4 between the moving electrode 5 and the fixed electrodes 21a and 21b individually become as in Expressions (3) and (4) shown below. Note that, in Expressions (3) and (4), a parameter C0 indicates electrostatic capacities between the moving electrode 5 and the fixed electrodes 21a and 21b in a state where the acceleration in the x-direction is not applied to the moving electrode 5.

$$C3 = C0 - \Delta C \quad (3)$$

$$C4 = C0 + \Delta C \quad (4)$$

Then, the above-described electrostatic capacities C1 to C4 are first detected through the detecting electrodes 8a and 8b and the detecting electrodes 9a and 9b. Next, a difference value CA (=C1−C2) between the capacity C1 and the capacity C2 and a difference value CB (=C3−C4) between the capacity C3 and the capacity C4 are calculated by using an ASIC and the like. Thereafter, the sum (±4ΔC) of the calculated difference value CA and difference value CB is outputted as an X-output, whereby the acceleration in the x-direction, which is applied to the moving electrodes 4 and 5, can be detected from a change of an electrostatic capacity value.

(Detection of Acceleration in Z-Direction)

In the case where the acceleration in the z-direction is applied to the moving electrode 4, the electrostatic capacities C1 and C2 between the moving electrode 4 and the fixed electrodes 20a and 20b individually become as in Expressions (5) and (6) shown below. Note that, in Expressions (5) and (6), a parameter C0 indicates electrostatic capacities between the moving electrode 4 and the fixed electrodes 20a and 20b in a state where the acceleration in the z-direction is not applied to the moving electrode 4.

$$C1 = C0 + \Delta C \quad (5)$$

$$C2 = C0 - \Delta C \quad (6)$$

Moreover, in a similar way, in the case where the acceleration in the z-direction is applied to the moving electrode 5, the electrostatic capacities C3 and C4 between the moving electrode 5 and the fixed electrodes 21a and 21b individually become as in Expressions (7) and (8) shown below. Note that, in Expressions (7) and (8), a parameter C0 indicates electrostatic capacities between the moving electrode 5 and the fixed electrodes 21a and 21b in a state where the acceleration in the z-direction is not applied to the moving electrode 5.

$$C3 = C0 - \Delta C \quad (7)$$

$$C4 = C0 + \Delta C \quad (8)$$

Then, the above-described electrostatic capacities C1 to C4 are first detected through the detecting electrodes 8a and 8b and the detecting electrodes 9a and 9b. Next, a difference value CA (=C1−C2) between the capacity C1 and the capacity C2 and a difference value CB (=C3−C4) between the capacity C3 and the capacity C4 are calculated by using the ASIC and the like. Thereafter, the sum (±4ΔC) of the calculated difference value CA and difference value CB is outputted as a Z-output, whereby the acceleration in the z-direction, which is applied to the moving electrodes 4 and 5, can be detected from a change of an electrostatic capacity value.

<Manufacturing Method of Acceleration Sensor>

Next, a description is made of a manufacturing method of the acceleration sensor of this embodiment with reference to FIGS. 6(a) to 6(e).

Figure 6:
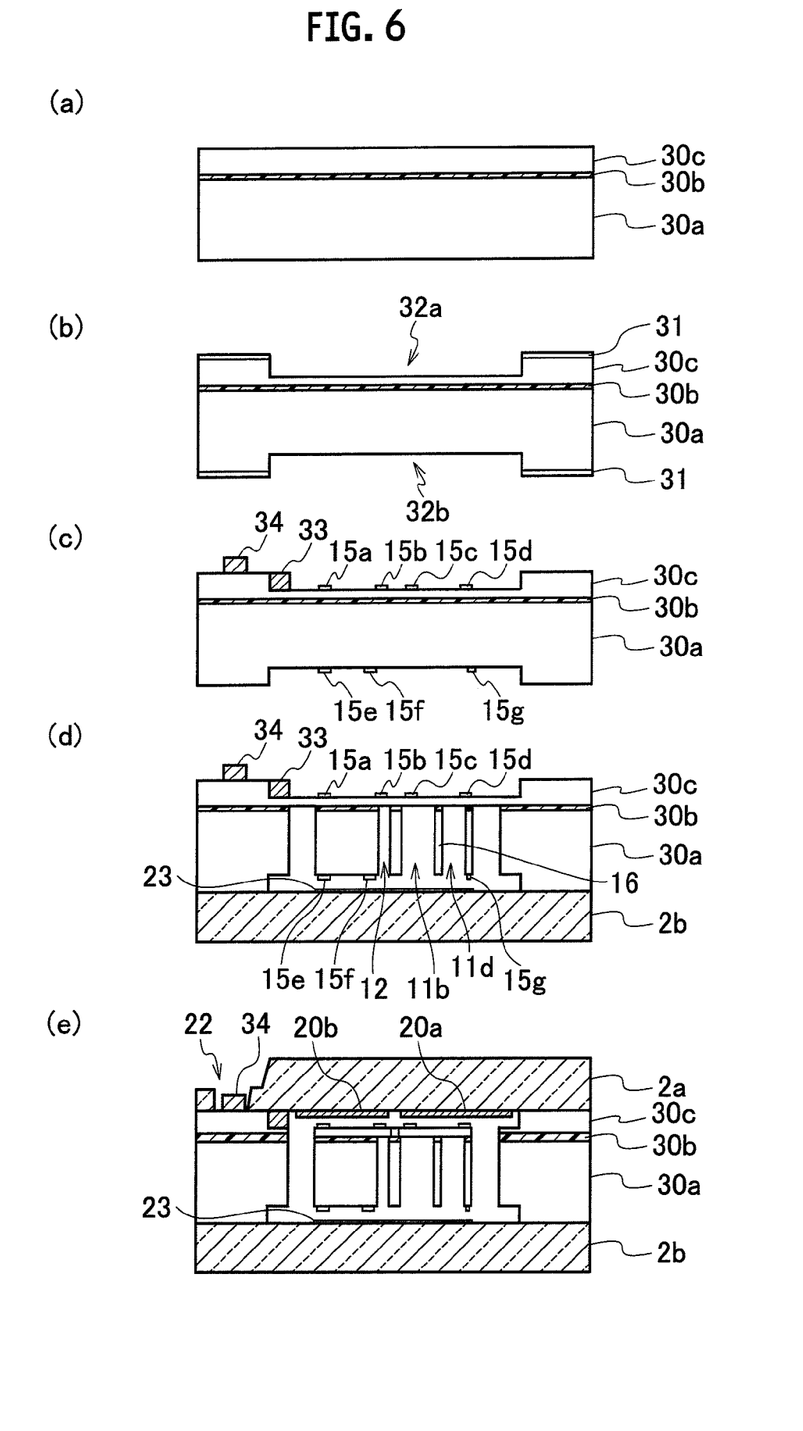
FIG. 6 is a schematic view showing a manufacturing process of the acceleration sensor according to the first embodiment.

In this embodiment, first, a silicon SOI substrate as shown in FIG. 6(a), which is formed of a support substrate 30a, an intermediate oxide film 30b and an active layer 30c, is prepared. Next, mask layers 31 such as silicon oxide films and photoresist films are formed on both surfaces of the silicon SOI substrate, and then the mask layers 31 at positions corresponding to the moving electrodes 4 and 5 are removed. Thereafter, wet etching using a solution such as a tetramethylammonium hydride solution (TMAH) and a potassium hydride solution (KOH) or dry etching such as reactive ion etching (RIE) is performed. Whereby, as shown in FIG. 6(b), recessed portions 32a and 32b for allowing movement of the moving electrodes 4 and 5 are formed on a front surface side and back surface side of the silicon SOI substrate.

Next, as shown in FIG. 6(c), silicon oxide films, carbon nanotubes and the like are adhered onto predetermined positions of bottom surfaces of the recessed portions 32a and 32b, whereby the protrusions 15 to 15g are formed. Moreover, at this time, by using a sputtering technology and an evaporation deposition technology, there are formed: a metal film 33 as the detecting electrodes 8a and 8b and the detecting electrodes 9a and 9b, which are electrically connected to the fixed electrodes; and a metal film 34 electrically connected to the metal film 33.

Here, in the case where the protrusions 15a to 15g are formed of the main material of the sensor chip, such as silicon and a silicon oxide film, then the protrusions 15a to 15g can be easily manufactured. Note that front surfaces of the protrusions 15a to 15g may be coated with a carbon material. With such a configuration, mechanical strength of the protrusions 15a to 15g is increased, and the protrusions 15a to 15g can be suppressed from being broken by collision thereof with the upper fixed plate 2a and the lower fixed plate 2b. Moreover, if the carbon nanotubes are used as the carbon material at this time, then a thickness of such coating therewith can be thinned, and accordingly, the protrusions 15a to 15g can be easily adjusted at a desired height.

Next, the back surface side of the silicon SOI substrate is etched in order of the support substrate 30a and the intermediate oxide film 30b, whereby, as shown in FIG. 6(d), the moving electrodes and the first and second recessed portions are formed. Then, after the moving electrodes and the first and second recessed portions are formed, the lower fixed plate 2b in which the surface having the adhesion prevention films 23 formed thereon is defined as an opposite surface is anodically bonded to the back surface side of the silicon SOI substrate.

Note that the adhesion prevention films 23 are formed of the same material as that of the fixed electrodes 20a, 20b, 21 and 21b, whereby the adhesion prevention films 23 can be easily formed. Moreover, the adhesion prevention films 23 are formed at the same time of forming the fixed electrodes 20a, 20b, 21a and 21b, whereby a distance between the fixed electrodes 20a, 20b, 21a and 21b and the moving electrodes 4 and 5 and a distance between the lower fixed plate 2b and the moving electrodes 4 and 5 can be accurately set.

Moreover, in the case where the adhesion prevention films 23 are deposited by such a semiconductor manufacturing process, micro irregularities are formed on front surfaces of the adhesion prevention films 23. Therefore, the moving electrodes 4 and 5 can be prevented from adhering onto the lower fixed plate 2b. Furthermore, in the case where the adhesion prevention films 23 are formed of the aluminum-based alloy, it becomes easy to process the adhesion prevention films 23 by etching, and accordingly, the adhesion prevention films 23 can be easily manufactured. Furthermore, on the front surfaces of the adhesion prevention films 23, organic material thin films, which are easy to process, and match the semiconductor manufacturing process well, are formed. Whereby short circuits between the adhesion prevention films 23 and the moving electrodes 4 and 5 may be prevented. Note that polyimide thin films can be used as the organic material thin films.

Next, as shown in FIG. 6(e), the upper fixed plate 2a in which the through holes 22 are formed and on which the fixed electrodes 20a and 20b are formed is arranged on the silicon SOI substrate, and thereafter, the silicon SOI substrate and the upper fixed plate 2a are anodically bonded to each other. In such a way, a series of the manufacturing process in the acceleration sensor in this embodiment is completed.

Note that the silicon SOI substrate, the upper fixed plate 2a and the lower fixed plate 2b may be bonded to one another by resin bonding using polyimide resin and the like or eutectic bonding using gold-tin solder and the like. Moreover, silicon substrates may be used as the upper fixed plate 2a and the lower fixed plate 2b. However, in the case where the silicon substrates are used as the upper fixed plate 2a and the lower fixed plate 2b, it is desirable to form an insulating film between the fixed electrodes and the upper fixed plate 2a so that the fixed electrodes and the upper fixed plate 2a can be electrically insulated from each other.

As obvious from the above description, the acceleration sensor of this embodiment includes: the rectangular moving electrodes 4 and 5; the pairs of beams 6a and 6b and beams 7a and 7b, each pair of which connects to the centers of two opposite sides of a corresponding one of the moving electrodes 4 and 5, and supports the corresponding one of the moving electrodes 4 and 5 freely swingably; and the fixed electrodes 20a and 20b and the fixed electrodes 21a and 21b, each pair of which is provided on one side of the boundary line and the other side thereof, respectively, and is arranged so as to be opposed to the front surface of the corresponding one of the moving electrodes 4 and 5. Note that the straight line that connects a corresponding one of the pair of beams 6a and 6b and the pair of beams 7a and 7b to each other is taken as the boundary line. Then, on the back surfaces of the moving electrodes 4 and 5, the recessed portions 11a, 11b, 11c and 11d (13a, 13b, 13c and 13d) and the recessed portions 12 (14) are formed on one side of the boundary line and the other side thereof, respectively. With such a configuration, the detection sensitivities for the accelerations in the x-direction and the y-direction can be equalized to each other without thickening the thickness of the moving electrodes 4 and 5.

Second Embodiment

Next, a description is made in detail of an acceleration sensor of a second embodiment based on the drawings. Note that the same reference numerals are assigned to the same components as those in the first embodiment, and a duplicate description is omitted.

<Configuration of Acceleration Sensor>

In a similar way to the first embodiment, the acceleration sensor of this embodiment has a configuration in which upper and lower surfaces of a sensor chip 1 formed of a silicon SOI substrate are sandwiched by an upper fixed plate 2a and a lower fixed plate 2b. The sensor chip 1 includes: a frame 3; and two rectangular moving electrodes 4 and 5 arranged in rectangular frames 3a and 3b. Moreover, the sensor chip 1 includes: a pair of beams 6a and 6b which support the moving electrode 4 freely swingably with respect to the frame 3; and a pair of beams 7a and 7b which support the moving electrode 5 freely swingably with respect to the frame 3. Furthermore, the above-described acceleration sensor includes: detecting electrodes 8a and 8b; and detecting electrodes 9a and 9b.

Moreover, in a similar way to the first embodiment, in the acceleration sensor of this embodiment, on a back surface of the moving electrode 4, a first recessed portion is formed on one side of a boundary line in the case where a straight line that connects the beams 6a and 6b to each other is taken as the boundary line. Moreover, on the back surface of the moving electrode 4, a recessed portion 12 is formed as a second recessed portion on the other side of the boundary line. In a similar way, on a back surface of the moving electrode 5, a first recessed portion is formed on one side of a boundary line in the case where a straight line that connects the beams 7a and 7b to each other is taken as the boundary line. Furthermore, on the back surface of the moving electrode 5, a recessed portion 14 as a second recessed portion is formed on the other side of the boundary line.

Figure 7:
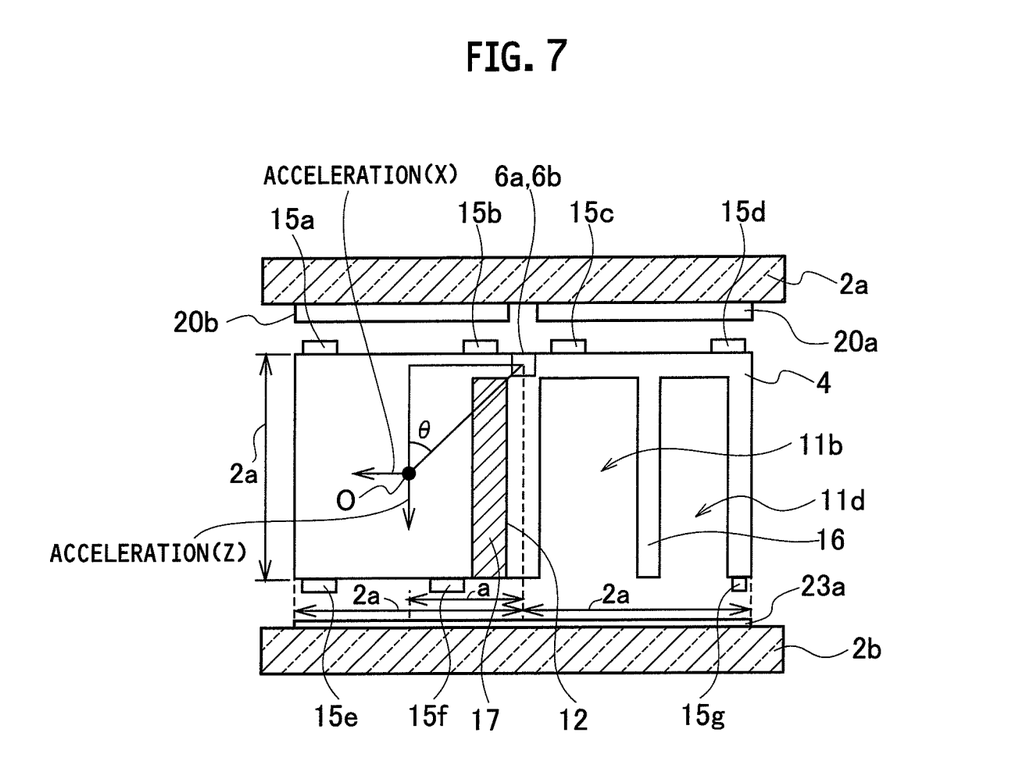
FIG. 7 is a partial cross-sectional view showing a configuration of an acceleration sensor according to a second embodiment of the present invention.

Then, in this embodiment, as shown in FIG. 7, a metal material 17 higher in specific gravity than a material for forming the moving electrodes 4 and 5 is embedded in the recessed portions 12 and 14 as the second recessed portion. In the case where the recessed portions 12 and 14 are formed on the back surfaces of the moving electrodes 4 and 5 as in the first embodiment, the entire weight of the moving electrodes 4 and 5 is decreased, and accordingly, the detection sensitivity of the acceleration sensor is sometimes lowered. However, in this embodiment, the metal material 17 higher in specific gravity than the material for forming the moving electrodes 4 and 5 is embedded in the recessed portions 12 and 14, and the weight of the moving electrodes 4 and 5 is not decreased to a large extent. Therefore, the detection sensitivities of the accelerations in the x-direction and the z-direction can be equalized to each other without lowering the detection sensitivity of the acceleration sensor.

Here, in the case where the moving electrodes 4 and 5 are formed of silicon, as the metal material 17, nickel (specific gravity: 8.90 g/cm$^3$), tungsten (specific gravity: 19.3 g/cm$^3$), chromium (specific gravity: 7.87 g/cm$^3$), palladium (specific gravity: 12.02 g/cm$^3$), platinum (specific gravity: 21.45 g/cm$^3$) and manganese (specific gravity: 7.43 g/cm$^3$) can be illustrated since the specific gravity of silicon is 2.33 g/cm$^3$.

Moreover, it is desirable that weight of the metal material 17 be substantially equal to weight of a reinforcement member 16 that is formed in an inside of the first recessed portion 11 and composes an interior wall of the first recessed portion 11. The weight of the metal material 17 is equalized to that of the reinforcement member 16, whereby a size of the moving electrodes 4 and 5 can be miniaturized without decreasing the entire weight of the moving electrodes 4 and 5, and an acceleration sensor with higher sensitivity and higher precision can be obtained.

Here, in a similar way to the first embodiment, it is preferable that a position at which the second recessed portion 12 having the metal material 17 filled therein is formed be set so that an angle made by a perpendicular line drawn down from a center of gravity O of the moving electrode 4 to a front surface 4a thereof and a straight line that connects the center of gravity O of the moving electrode 4 and the boundary line to each other can be approximately 45 degrees. In such a way, the detection sensitivities in the x-direction and the z-direction become equal to each other, and accordingly, the detection sensitivities in the respective directions can be enhanced.

<Manufacturing Method of Acceleration Sensor>

Figure 8:
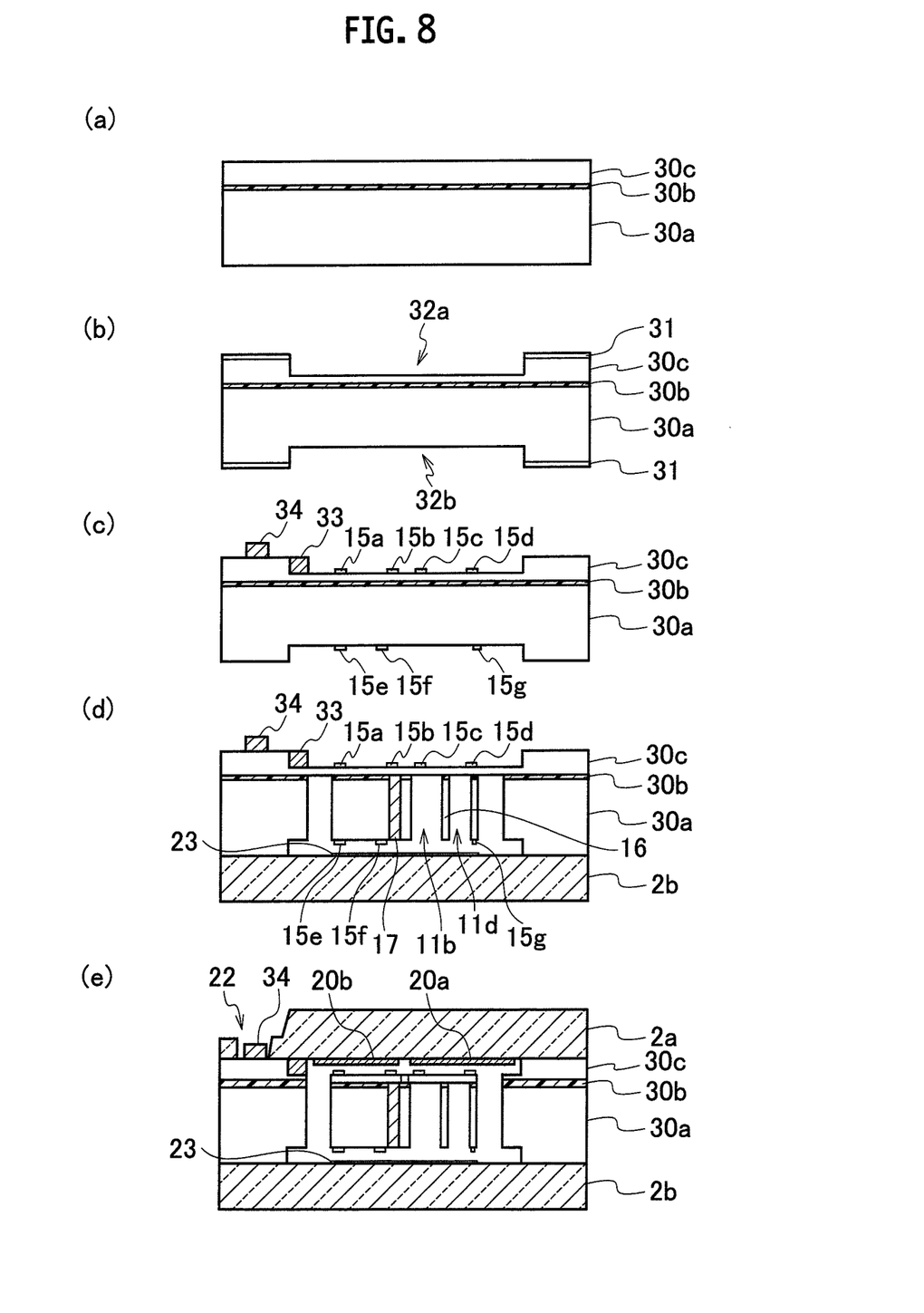
FIG. 8 is a schematic view showing a manufacturing process of the acceleration sensor according to the second embodiment.

Next, a description is made of a manufacturing method of the acceleration sensor of this embodiment with reference to FIG. 8.

In this embodiment, first, a silicon SOI substrate as shown in FIG. 8(a), which is formed of a support substrate 30a, an intermediate oxide film 30b and an active layer 30c, is prepared. Next, in a similar way to the first embodiment, mask layers 31 are formed on both surfaces of the silicon SOI substrate, and the mask layers 31 at positions corresponding to the moving electrodes 4 and 5 are removed. Thereafter, the above-described wet etching or dry etching is performed. Whereby, as shown in FIG. 8(b), recessed portions 32a and 32b for allowing displacement of the moving electrodes 4 and 5 are formed on a front surface side and back surface side of the silicon SOI substrate.

Next, as shown in FIG. 8(c), in a similar way to the first embodiment, there are formed: protrusions 15a to 15g; a metal film 33 as the detecting electrodes 8a and 8b and the detecting electrodes 9a and 9b; and a metal film 34 electrically connected to the metal film 33.

Next, the back surface side of the silicon SOI substrate is etched in order of the support substrate 30a and the intermediate oxide film 30b, whereby, as shown in FIG. 8(d), the moving electrodes and the first and second recessed portions are formed. Moreover, the metal material 17 is embedded in the second recessed portion. Then, the lower fixed plate 2b in which the surface having the adhesion prevention films 23 formed thereon is defined as an opposite surface is anodically bonded to the back surface side of the silicon SOI substrate.

Next, as shown in FIG. 8(e), the upper fixed plate 2a in which through holes are formed and on which fixed electrodes are formed is arranged on the silicon SOI substrate, and thereafter, the silicon SOI substrate and the upper fixed plate 2a are anodically bonded to each other. In such a way, a series of the manufacturing process in the acceleration sensor in this embodiment is completed.

As described above, in the acceleration sensor of this embodiment, the metal material 17 higher in specific gravity than the material for forming the moving electrodes 4 and 5 is embedded in the recessed portions 12 and 14 as the second recessed portion. In such a way, the detection sensitivities of the accelerations in the x-direction and the z-direction can be equalized to each other, and further, the weight of the moving electrodes 4 and 5 is not decreased to a large extent, and accordingly, the acceleration sensor with higher sensitivity and higher precision can be provided.

The entire contents of Japanese Patent Application No. 2008-299989 (filed on Nov. 25, 2008) and Japanese Patent Application No. 2008-300004 (filed on Nov. 25, 2008) are incorporated herein by reference.

The description has been made above of the contents of the present invention along the embodiments and the examples. However, it is obvious for those skilled in the art that the present invention is not limited to the description of these, and is modifiable and improvable in various ways.

INDUSTRIAL APPLICABILITY

In accordance with the acceleration sensor of the present invention, the recessed portions are formed also on the other side as well as on one side of the back surface of the moving electrode in which the straight line that connects the pair of beams to each other is taken as the boundary line, whereby the detection sensitivity is adjusted between two directions.

Therefore, the detection sensitivity can be equalized between two directions without requiring a long manufacturing time.

REFERENCE SIGNS LIST

2a: Upper fixed plate
2b: Lower fixed plate
3: Frame
4, 5: Moving electrode
6a, 6b, 7a, 7b: Beam
8a, 8b, 9a, 9b: Detecting electrode
11, 13: First recessed portion
12, 14: Second recessed portion
15a, 15b, 15c, 15d, 15e, 15f, 15g: Protrusion
16: Reinforcement member
17: Metal material
23a, 23b: Adhesion prevention film

The invention claimed is:

1. An acceleration sensor, comprising:
a rectangular moving electrode;
a pair of beams which connect to centers of two opposite sides of the moving electrode, and support the moving electrode freely swingably,
wherein a straight line that connects the pair of beams to each other is taken as a boundary line,
wherein, on a back surface of the moving electrode, first and second recessed portions are formed on one side of the boundary line and the other side thereof, respectively,
wherein the first recessed portion and the second recessed portion are asymmetrical with respect to the boundary line, and
wherein the second recessed portion is arranged between the boundary line and the center of gravity of the moving electrode.

2. The acceleration sensor according to claim 1,
wherein the acceleration sensor detects acceleration in a first direction, which is applied to the moving electrode, and acceleration in a second direction, which is applied to the moving electrode and is orthogonal to the acceleration in the first direction.

3. The acceleration sensor according to claim 1, further comprising:
a fixed plate arranged to be opposed to the back surface of the moving electrode at a predetermined interval,
wherein an adhesion prevention film, which prevents adhesion between the moving electrode and the fixed plate, is formed on a surface of the fixed plate, and the surface is opposed to the moving electrode.

4. The acceleration sensor according to claim 3,
wherein an organic material thin film is formed on a front surface of the adhesion prevention film.

5. The acceleration sensor according to claim 1,
wherein an angle made by a perpendicular line drawn down from a center of gravity of the moving electrode to the front surface thereof and a straight line that connects the center of gravity of the moving electrode and the boundary line to each other is approximately 45 degrees.

6. The acceleration sensor according to claim 1,
wherein a metal material is embedded in the second recessed portion.

7. The acceleration sensor according to claim 6,
wherein the metal material is formed of a metal material having specific gravity equal to or larger than specific gravity of a material for forming the moving electrode.

8. The acceleration sensor according to claim 6,
wherein weight of the metal material is substantially equal to weight of a reinforcement member that constructs an outer wall of the first recessed portion.

9. An acceleration sensor structure, comprising:
a plurality of the acceleration sensors, each acceleration sensor according to claim 1,
wherein the acceleration sensors are formed in a same chip plane.

10. The acceleration sensor structure according to claim 9,
wherein two of the acceleration sensors are arranged in the same chip plane, and
one of the acceleration sensors is arranged to rotate by 180 degrees with respect to the other acceleration sensor in the chip plane.

11. The acceleration sensor structure according to claim 9,
wherein three of the acceleration sensors are arranged in the same chip plane, and
second and third acceleration sensors are arranged to rotate by 90 degrees and 180 degrees, respectively with respect to a first acceleration sensor in the chip plane.

12. The acceleration sensor according to claim 1,
wherein the first recessed portion is larger in volume than the second recessed portion.

13. The acceleration sensor according to claim 12,
wherein the first recessed portion has a reinforcement member.

14. An acceleration sensor, comprising:
a rectangular moving electrode;
a pair of beams which connect to centers to two opposite sides of the moving electrode, and support the moving electrode freely swingably,
wherein a straight line that connects the pair of beams to each other is taken as a boundary line,
wherein, on a back surface of the moving electrode, first and second recessed portions are formed on one side of the boundary line and the other side thereof, respectively,
wherein only the first recessed portion has a reinforcement member,
wherein the first recessed portion is larger in volume than the second recessed portion,
wherein a metal material is embedded in the second recessed portion, and
wherein weight of the metal material is substantially equal to weight of a replacement member that constructs an interior wall of the first recessed portion.

15. The acceleration sensor according to claim 14,
wherein the acceleration sensor detects acceleration in a first direction, which is applied to the moving electrode, and acceleration in a second direction, which is applied to the moving electrode and is orthogonal to the acceleration in the first direction.

16. The acceleration sensor according to claim 14, further comprising:
a fixed plate arranged to the opposed to the back surface of the moving electrode at a predetermined interval,
wherein an adhesion prevention film, which prevents adhesion between the moving electrode and the fixed plate, is formed on a surface of the fixed plate, and the surface is opposed to the moving electrode.

17. The acceleration sensor according to claim 16,
wherein an organic material thin film is formed on a front surface of the adhesion prevention film.

18. The acceleration sensor according to claim 14,
wherein an angle made by a perpendicular line drawn down from a center of gravity of the moving electrode to the front surface thereof and a straight line that connects the center of gravity of the moving electrode and the boundary line to each other is approximately 45 degrees.

19. The acceleration sensor according to claim 14, wherein the metal material is formed of a metal material having a specific gravity equal to or larger than specific gravity of a material for forming the moving electrode.

20. An acceleration sensor structure, comprising:
a plurality of acceleration sensors, each acceleration sensor according to claim 14, wherein the acceleration sensors are formed in a same chip plane.

21. An acceleration sensor structure according to claim 20, wherein two of the acceleration sensors are arranged in the same chip plane, and
one of the acceleration sensors is arranged to rotate by 180 degrees with respect to the other acceleration sensor in the chip plane.

22. The acceleration sensor structure according to claim 20,
wherein three of the acceleration sensors are arranged in the same chip plane, and
second and third acceleration sensors are arranged to rotate by 90 degrees and 180 degrees, respectively, with respect to a first acceleration sensor in the chip plane.

\* \* \* \* \*